Oct. 16, 1945.　　　M. D. SULLIVAN　　　2,386,988
TRAILER SUSPENSION
Filed Nov. 25, 1942　　　3 Sheets-Sheet 1

Inventor
Mathew D. Sullivan
By Liverance and
Van Antwerp
Attorneys

Oct. 16, 1945.    M. D. SULLIVAN    2,386,988
TRAILER SUSPENSION
Filed Nov. 25, 1942    3 Sheets-Sheet 3

Inventor
Mathew D. Sullivan
By Liverance & Van Antwerp
Attorneys

Patented Oct. 16, 1945

2,386,988

UNITED STATES PATENT OFFICE 2,386,988

TRAILER SUSPENSION

Mathew D. Sullivan, Flint, Mich.

Application November 25, 1942, Serial No. 466,881

4 Claims. (Cl. 280—104.5)

This invention relates to a wheel suspension means, particularly for trailers, in which I have developed the invention, but without intent to limit the invention solely to trailers as it has other places of use in conjunction with various types of vehicles. Trailers in general refer to vehicles drawn by motor cars and are used for carrying goods and materials and many times serve as dwellings which may be readily moved from one place to another. The trailer has a chassis frame which is connected at its front end to the pulling vehicle, such as an automobile, and is carried toward the rear by wheels equipped with tires. Above the frame will be mounted the trailer body which may be of many and various kinds.

Such trailers in moving from one place to another may be pulled at relatively high speeds of movement, are subject to considerable side wind pressure as the body of the trailer may be quite high, the tires on the wheels have been subjected to extra burdens and, particularly in the wider trailers, as wide as legally permitted on the highway, the axles on which the wheels are mounted have necessarily been heavy and cumbersome, therefore expensive. Moreover, trailers generally as previously made when brought to a place where they are to be left for a while have the weight of the trailer and its contents carried either directly on the tires resting on the ground (this being the most usual practice) or the trailer may be elevated to lift the tires from the ground and carried on suitable supports, but with the wheels and tires remaining connected with the trailer and subjected to weather exposure which in itself effects substantially as much deterioration in a tire as does operative use thereof.

It is one object and purpose of my invention to provide a trailer for living purposes as wide as legally permitted and in which a suitable heating system may be installed without interference with the under carriage. It is a further object and purpose of the invention to provide an under carriage for the trailer at low cost, one with which the trailer will not unduly sway in the wind nor roll over upon a tire blowout, which will carry maximum load, which will position the trailer low with relation to the ground, which is stabilized against overturning and in which there is no undue strain upon the frame, springs, shackles and axles used, and with the weight greatly reduced.

Further, it is an object and purpose of my invention to provide a carrying suspension for the trailer and frame, providing an under carriage that will withstand severe shocks without upsetting and in which unsprung weight is reduced to a minimum. Moreover, the wheel carriage for the trailer is readily removable and after a trailer has been delivered to a place where it is to stay and be occupied, substantially the same as a house is occupied, said carriage may be removed and the trailer frame and body carried on a suitable foundation of any desired kind, the carriage being available for transportation of other trailers.

Many other objects and purposes and desirable results coming from my invention will appear and be understood from the following description of practical embodiments of my invention, shown in the accompanying drawings, in which, Fig. 1 is a plan view of a trailer frame and under wheel carriage or suspension illustrating one form of my invention.

Like reference characters refer to like parts in the different figures of the drawings.

Figure 3:
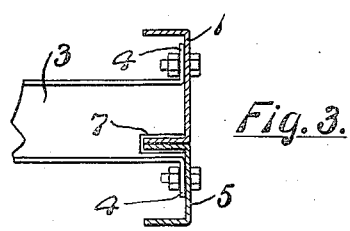
Fig. 3 is a fragmentary transverse section through one side of the trailer frame illustrating the detail of connection of a strengthening cross frame member thereof.
Figure 4:
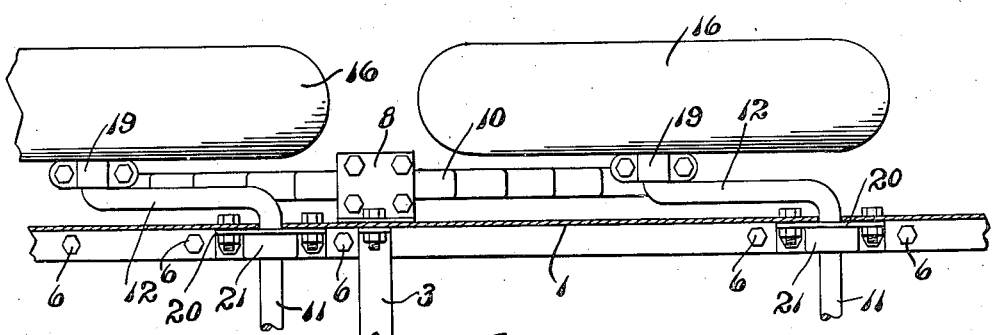
Fig. 4 is a fragmentary plan view at one side and at the rear portion of the trailer frame shown in Fig. 1, the side chassis member being in horizontal section.
Figure 5:
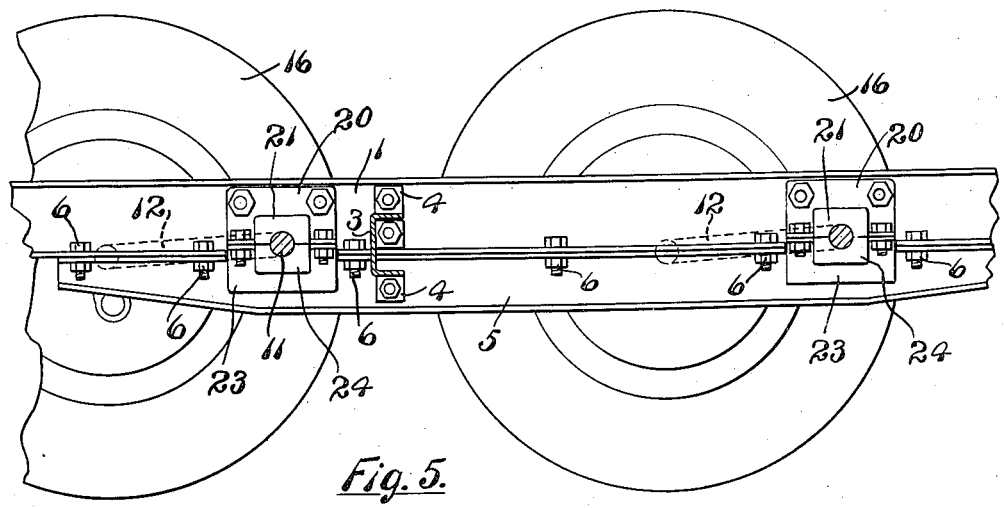
Fig. 5 is a fragmentary enlarged horizontal section taken longitudinally of the trailer at its rear end between its sides.

The chassis frame includes two spaced apart side channels 1 which may be connected with converging members 2 at their front ends at which the hitch connection for attachment to a pulling vehicle, like a motor car, is located. A cross channel 3 extends between the side chassis frame members 1 and has ears 4 turned therefrom at its ends for connection to the side channels 1 and to and underneath channel members 5 located one below each of the side channels 1. Said under channels 5 have their upper flanges lying against the lower flanges of the frame members 1, said contacting flanges being releasably secured by removable bolts 6. The web of the cross channel 3 at its ends is slotted as at 7 (Fig. 3) for the reception of said contacting flanges. Likewise, the channels 3 at their ends are connected to the under members 5 by means of removable bolts so that said under members 5 may be readily removed when desired as will be hereafter described.

Figure 1:
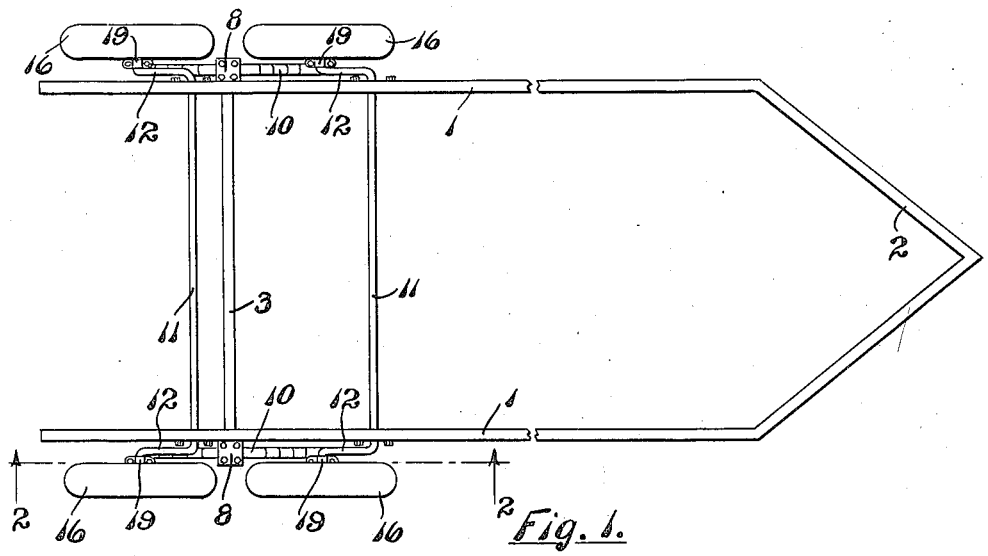
Figure 2:
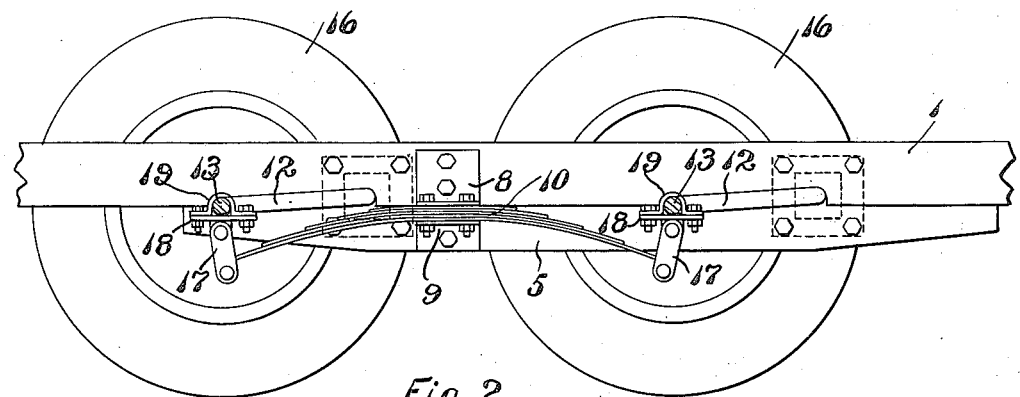
Fig. 2 is a fragmentary enlarged section and side elevation, the section being substantially on the plane of line 2—2 of Fig. 1 looking in the direction indicated.

At each side of the frame pairs of angle brackets 8 and 9 are located (Fig. 2) substantially at the ends of the cross channel frame member 3, having vertical legs which are respectively bolted to the chassis frame members 1 and under members 5 and spaced horizontal legs extending outwardly between which a leaf spring 10 is located and fixedly secured substantially at its middle.

Figures 6, 7:
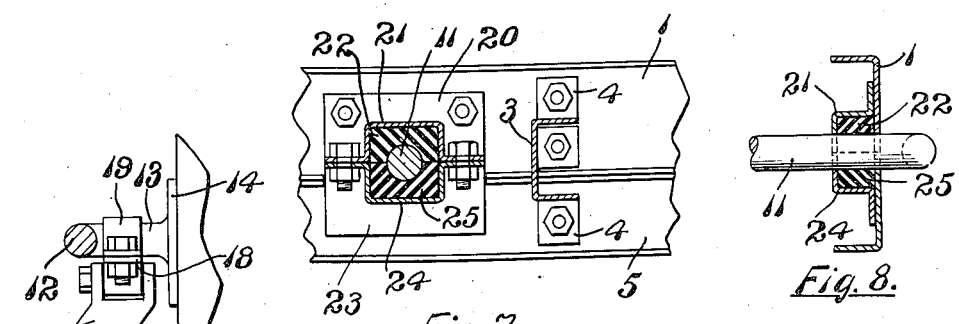
Fig. 6 is a fragmentary elevation showing the preferred spring shackle mounting.
Fig. 7 is a fragmentary vertical section through the rubber mounting of the wheel carrying shafts.
Figure 11:
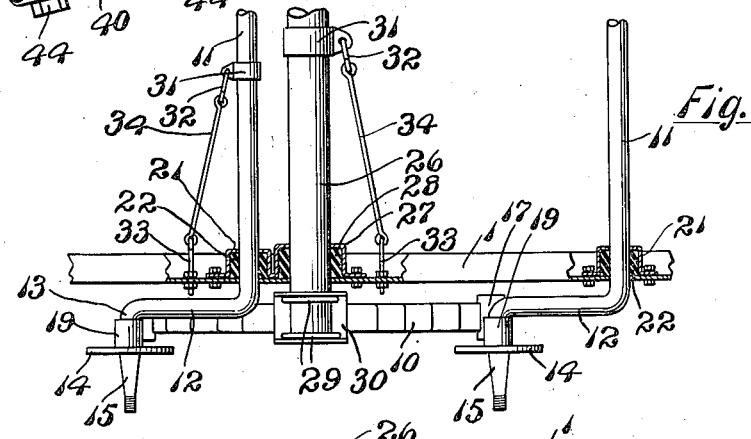
Fig. 11 is a fragmentary plan view and partial horizontal section showing a modified form of the construction from that illustrated in Figs. 1 to 5 inclusive.

In this embodiment of the invention two shafts 11 are used extending between the side frame members 1 which are notched at their lower sides (Fig. 2), the under members 5 passing immediately below said shafts. Each shaft 11 at its end and beyond the outer sides of the frame members 1 is turned rearwardly at right angles providing arms 12. Each arm 12 at its rear end is bent to extend outwardly at right angles at 13 for a short distance having integral therewith a flange 14 and an axle 15 (Fig. 11). On the axles 15 wheels 16 are rotatively mounted carrying the usual pneumatic tires. At each end of each of the springs 10 a shackle 17 is pivotally connected extending upwardly therefrom and having pivotal connection at its upper end to a leg extending downwardly from a lower plate 18 which is bolted to an upper stirrup 19 passing over and partly embracing the parts 13 of the axles immediately inside of the flanges 14. As shown in Fig. 6 the shackles 17 are offset at an angle to the vertical.

Figure 8:
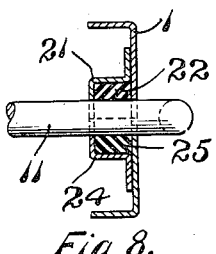
Fig. 8 is a vertical section at right angles to that shown in Fig. 7 showing such rubber mounting.

Said shafts 11 are mounted in rubber bearings. These bearings may consist of an upper plate 20 mounted at the inner side of the chassis frame member 1 and which is formed with a centrally located housing 21 open at its lower side, and in which the upper half 22 of a rubber bearing support is located (Figs. 7 and 8).

A second lower plate 23 with a complementary housing 24 is bolted to each upper member 20 and in the housing 24 a lower half 25 of a rubber bearing member is received so that the shaft at opposite end portions is between the rubber bearing blocks 22 and 25.

It will be apparent that by removing the bolts 6 and disconnecting the bolts which connect the two bearing housing members 21 and 23 together, and removing the bolts which connect the lower members 5 with the ends of the channel 3, also disconnecting the upper brackets 8 from the chassis side frame members 1 the wheel carriage for the trailer may be removed after which the members 5 may be replaced. Accordingly when a trailer has been transported to its destination and placed upon its foundation, which may be either permanent or temporary, the axles, wheels and springs and other parts comprising the lower carriage assembly for the trailer may be removed. It may be returned for use in transporting other trailers or it may be stored in a place where the damaging effects of exposure upon the tires may be avoided and the under carriage not left on the trailer with all of the weight bearing upon the tires as is altogether too much a common practice.

Figure 12:
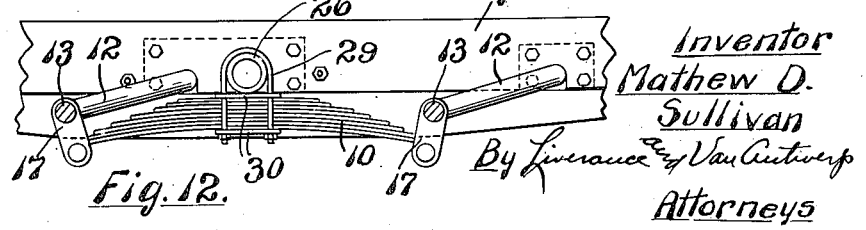
Fig. 12 is a side elevation thereof.

In Figs. 11 and 12 the cross channel member 3 is replaced by a shaft 26 which passes through the chassis frame members 1 and through a two-part housing 27 within which is a rubber bearing 28 of the same two-part structure as the rubber bearings mounting the shafts 11. The leaf springs 10 are mounted underneath the projecting ends of the shaft 26 by means of U-bolts 29 and upper and lower plates 30 and 31, the upper one of which may have a permanent connection by welding or otherwise to said shaft 26. In all cases, preferably the shafts will pass through openings in the housing members 21, 24 and 27 slightly elongated vertically to permit some relative movement of the trailer and the chassis frame thereon with reference to the shafts.

In this construction a distance inward from each end of the shafts 11 and 26 a clamp 31 is fixed to said shafts each having a projecting ear with a short link 32 pivotally connected therewith. An eye-bolt 33 for each of the shafts at each end is mounted securely on the chassis frame members 1 and a long link 34 with eyes at each end connects the eye-bolts 33 with the links 32 as shown. This anchors the shafts against longitudinal movement but permits rotative or rocking movement thereof.

The structure shown in Figs. 11 and 12 is preferred for some reasons over the first described structure, making the carrying unit for the trailer movable as a whole about the axis of the shaft 26 in addition to the separate rocking movements of the shafts 11 when shocks are imparted to the wheels in traveling over the road.

Figure 9:
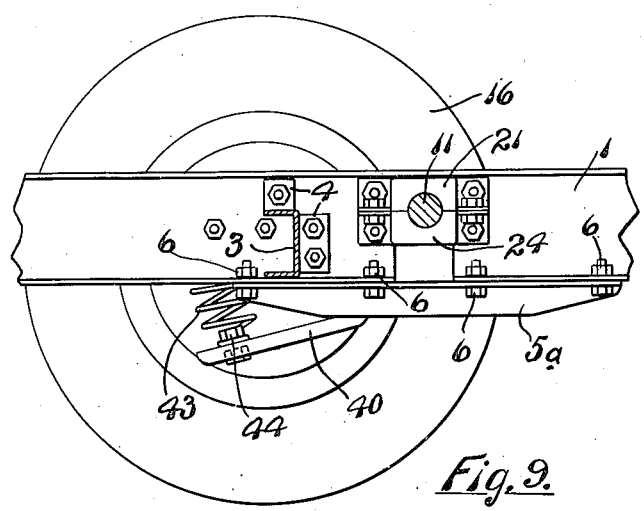
Fig. 9 is a fragmentary longitudinal section, similar to that shown in Fig. 5, of a wheel carriage for trailers and the like in which one axle and two wheels are used instead of two axles and four wheels as in the previously illustrated structure.
Figure 13:
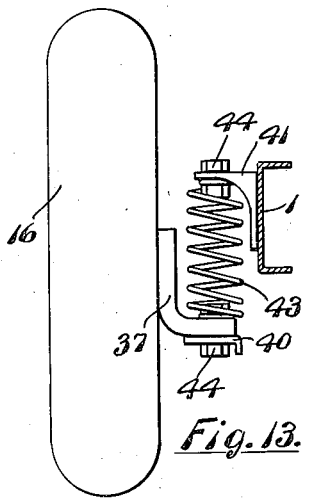
Fig. 13 is a fragmentary end elevation and transverse section illustrating the spring mounting of the shaft and wheels in the construction shown in Figs. 9 and 10.
Figure 10:
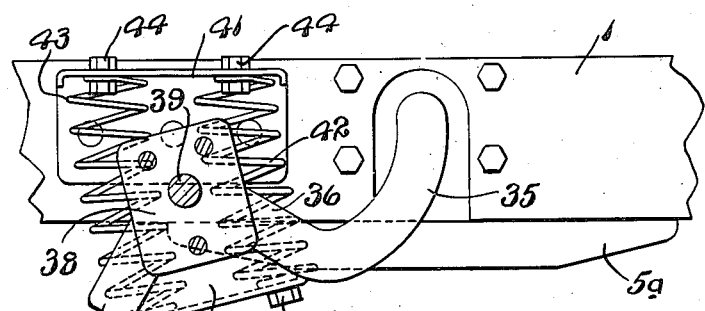
Fig. 10 is a side elevation of the structure shown in Fig. 9 with the wheel removed.

In Figs. 9, 10, and 13 the invention is shown as applied in connection with smaller trailers, a single shaft 11 being used and mounted for rocking movements in rubber bearings. At each end the shaft beyond the sides of the trailer frame members 1 is provided with an irregular shaped arm having three sections 35, 36 and 37 as shown in Fig. 10, which extend downwardly and to the rear, the terminal sections 36 and 37 being angularly disposed to each other. A plate 38 is secured to the arms or sections 36 and from it or through it axle 39 on which the wheel is mounted extends, said plate being connected to the brake drum which is fixed on the axle.

A bottom bracket support 40 extends between and is permanently connected to said sections 36 and 37, and a top bracket 41 is permanently connected to the outer sides of the trailer frame side members 1. Coiled springs 42 and 43 spaced from each other, one ahead and the other back of the wheel axle 39 are located between said mounting plates 40 and 41 and at their ends connected therewith by means of bolts and nuts 44.

The front springs 42 substantially at all times are under compression or at least are not designed to be elongated beyond a neutral position. The rear springs 43 at times are under compression and at other times under tension with the movements of the wheels and the attendant rocking of shaft 11, said rear springs 43 when under tension acting as snubbers or absorbers of shock under those conditions where the trailer and its attached frame are elevated above normal position with respect to the wheels or the wheels are at a lower position than normal position with respect to the trailer. This form of construction permits the light trailer to be drawn at high speed over rough ground, for example, behind an Army jeep withstanding and absorbing compression shocks by the resistance to compression of all springs and holding against undue rebound by reason of the tension resistance provided by the rear springs 43 should the wheels leave the ground.

In both forms of structure the under carriage is removable from the frame by removing the bars 5 and other parts as described in the larger structure which has four wheels, two at each side to carry it; and also in the lower structure by removing the bars 5a which are bolted to the under side of the chassis side frame members 1, shaft 11 being movable downwardly through slots in the chassis frame members for disconnection of the wheel unit.

With the constructions described an under carriage for trailers is provided of a simple, light weight, economical construction yet one which is strong and durable. With the double or tandem wheel embodiment using four wheels, one of the wheels can be removed and the trailer still operate, therefore if a tire on one of the wheels is punctured or blows out it does not require stopping to repair or replace it at the time. Such under carriage structures are easy to service and easily removed from the frame in all forms of structure shown. Shackles are not subject to side strain as side thrust and turning twist is taken care of by the stabilizer rods 34. When brakes are applied to the wheels direct pressure is placed upon the springs. There is little unsprung weight. The structure is stable and will not tip over upon the blowing out of a tire. therefore tires may be used until substantially worn out. The frame is insured against damaging or springing out of line. it is in a low position with reference to the ground, there are no obstructions for the installation of heating pipes in a trailer mounted upon the frame. In the tandem form shown in Figs. 1 to 5 inclusive. each axle has an independence of movement. one shaft 11 being permitted to work indepently of the other shaft with shocks taken by the leaf springs 10. In the form shown in Figs. 11 and 12 the independence of the axle movements is retained and the entire wheel unit has a further flexibility of movement by reason of the free or floating mounting of the shaft 26 which may turn about its longitudinal axis.

In addition to the wheel suspension unit being of particular use in conjunction with trailers. it may also be used for an under carriage for a gun or tank. for factory moving trucks and small or toy wagons and autos. In striking bumps upon the road for example by one wheel the shock is not taken by one spring alone but is transferred to both springs by reason of the novel construction provided. As the shackles are not subject to side strain they may be made as shown in Fig. 6, that is, offset to bring the burden carried by the wheels nearer the central plane of the wheels.

Many variations in detail of structure may be resorted to without departing from the invention. The disclosures made while very practical and successful are not to be construed in any way as limiting the invention to the specific forms outlined.

The invention is defined in the appended claims and is to be considered comprehensive of all forms of structure coming within their scope.

I claim:

1. A frame having two spaced apart substantially horizontal frame members, a shaft located transversely of the frame members and at each end extending a short distance beyond the outer sides thereof, arms permanently connected with the ends of the shaft and located at right angles thereto, wheel carrying axles permanently connected to the outer ends of said arms and extending outwardly therefrom, wheels rotatably mounted on said axles, spring means interposed between said arms and the chassis frame members, and a link assembly comprising a plurality of pivotally connected links connected at one end to each of the chassis frame members and extending inwardly therefrom and connected at opposite ends to said shaft.

2. A frame including spaced substantially horizontal frame members, a wheel carriage including two spaced apart shafts located transversely of the frame and at each end extending a short distance beyond adjacent sides of the frame, crank arms at the ends of the shafts, wheels rotatably mounted on said arms, spring means between said shafts and the chassis frame, links connected to each of said shafts one a distance inwardly from each frame member, anchor links connected to each frame member adjacent but spaced from the shafts, and connecting links pivotally connected to said anchors and to the first mentioned links holding the shafts from endwise movement and permitting rocking movement thereof.

3. A vehicle suspension unit adapted to be detachably connected with a chassis frame of a trailer or the like comprising, two spaced horizontal shafts each having an arm at each end thereof turned therefrom and located in planes perpendicular to the axes of the shafts, wheel axles extending outwardly from the free ends of said arms having axes parallel to the axes of the shafts, wheels mounted on said axles, leaf springs extending between said wheel axles and connected at their ends thereto, a third shaft extending between said springs, means connecting said third shaft adjacent its ends to said springs substantially midway between their ends, two bearings mounted on each of said shafts adapted to be secured to side chassis frame members of a trailer chassis, links pivotally connected to each of said shafts inwardly a distance from each end thereof and means at the outer ends of said links for detachably connecting them to the chassis frame members of a trailer chassis.

4. A chassis frame having spaced substantially horizontal frame members, two shafts mounted transversely of said frame members, at each end extending beyond said adjacent frame members, each of said shafts at each end having an arm secured thereto substantially parallel to the adjacent frame member, each arm at each end having an outwardly extending wheel axle secured thereto, said arms extending from said shafts in the same direction, wheels on said axles, a rod extending transversely of said frame, means for mounting the rod on the frame members for rocking movement about its longitudinal axis, a leaf spring connected to said rod at each end thereof, said springs being located below the rod and extending in opposite directions therefrom, shackles connecting the ends of the leaf springs with the adjacent arms of said shafts, said shafts and rod being located at the lower portions of the frame members, and bars, one underneath each frame member detachably connected therewith, said bars extending under said shafts and rod, whereby on disconnection of the bars, the shafts, rods, springs and wheels, as an under carriage unit, may be removed.

MATHEW D. SULLIVAN.